Figure 1:
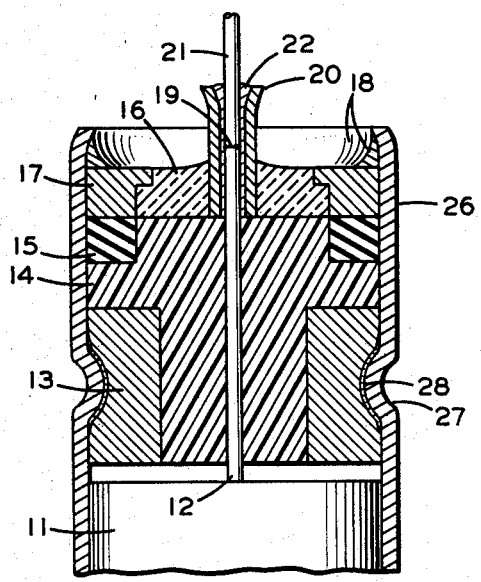

United States Patent Office 3,131,337
Patented Apr. 28, 1964

3,131,337
ELECTROLYTIC CAPACITOR SEAL
Warren J. Clement, Williamstown, Mass., assignor to Sprague Electric Company, North Adams, Mass., a corporation of Massachusetts
Filed May 18, 1962, Ser. No. 195,811
6 Claims. (Cl. 317—230)

This invention relate to electrolytic capacitors and more particularly to end-seal constructions for electrolytic capacitors.

Electrolytic capacitor assemblies generally comprise a container, such as a can, into which a capacitor section is placed. The container, fitted with some type of end-seal, serves to retain the electrolyte necessary for operation of the capacitor. The electrolyte is usually a liquid or a paste and often of a corrosive nature. Prior art end-seals have not been successful in coping with the problem of electrolyte creepage. This creepage occurs along the boundaries of the different materials employed as the sealing means.

The use of a glass-to-metal seal alone would not solve the problem. Glass-to-metal seals are constructed of a central tubular metal eyelet, through which passes the capacitor section lead-wire, a mass of glass surrounds and is fused to said metal member; and about this mass of glass is a metal ring or washer to which the glass is fused. This glass-to-metal seal is positioned in the end of the capacitor can and soldered at its periphery to the can wall. In a tantalum capacitor the internal lead-wire must also be tantalum. This is then butt-welded to a solderable wire. The point of butt-weld is located about midway within the central tubular metal member and held in place by solder. Electrolyte creeps along the internal lead-wire to the area of the metal eyelet. Here an electrolyte bridge is formed between the capacitor case wall and either the eyelet, the solder in the eyelet, the point of butt-weld, or all three. This bridge results in a large increase in the leakage current which in a short period of time leads to electrical failure of the capacitor.

A further disadvantage of this seal is that galvanic corrosion takes place between the different metals within the eyelet and also between the different metals at the joint where the glass-to-metal seal is soldered to the can wall. This corrosive action eventually will break the solder seal permitting loss of electrolyte. Current emphasis is on extremely small components, hence, in miniature and subminiature capacitors the loss of even a minute amount of electrolyte can not be tolerated. The problem of electrolyte creepage is aggravated by the present day requirements which call for operating at extremely high temperatures, for example, 100–200° C.

It is an object of this invention to overcome the foregoing and related disadvantages.

It is another object of this invention to provide a hermetically sealed capacitor.

Another object is to provide a capacitor having a seal capable of withstanding internal pressure without breaking.

Still another object is to provide an electrolytic capacitor having a seal designed to prohibit electrolyte creepage at the interface of the different materials making up the capacitor.

Yet another object is to provide an electrolytic capacitor having a true hermetic seal.

Figure 3:
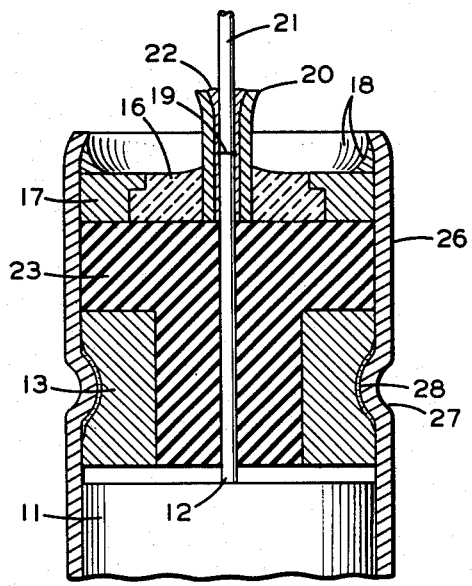
Figure 2:
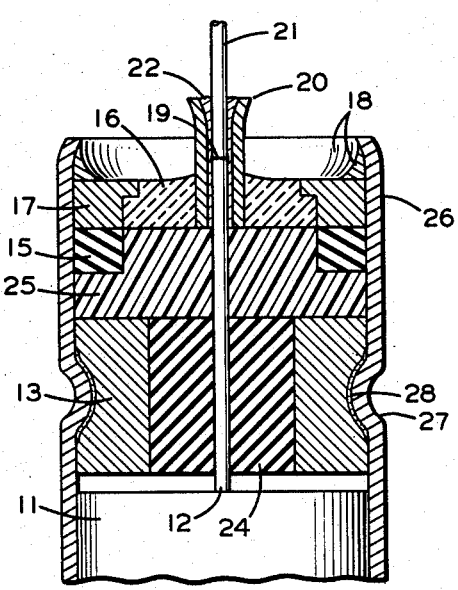

These and other objects will become apparent from the description of the invention when read in conjunction with the accompanying drawings, wherein:

FIGURES 1, 2, and 3 show three variations of the subject end-seal assemblies shown in section.

Broadly stated, the invention is concerned with an inner and an outer seal for an electrolytic capacitor. Common to the three variations shown in FIGURES 1, 2, and 3 is the outer seal which is similar in construction to the glass-to-metal seal referred to above. Contacting this glass-to-metal seal is an inner seal comprising a compressible member sandwiched between said glass-to-metal seal and a metal annulus. The compressible member can be a unitary member or made up of several parts as shown in the drawing.

The features and details of the construction shown in FIGURE 1 and the process by which it was formed are as follows: A tantalum oxide filmed tantalum lead-wire 12 is affixed to a tantalum foil section 11. The lead-wire is forced through a Teflon (polytetrafluoroethylene) gasket 14 which is contained by a press-fit in a circumferentially grooved, silver-plated brass annulus 13. This assembly is inserted into a silver-plated brass capacitor case 26 and held in place by an internal beading 27 which engages the groove in annulus 13. An elastomer O-ring 15 is positioned in a peripheral recess in gasket 14. In the uncompressed state this O-ring bulges out of said recess. A standard compression glass-to-metal seal assembly is inserted into the end of the case and against the O-ring 15 and gasket 14. This seal is composed of a mass of glass 16 surrounding and fused to a tubular metal eyelet 20 and surrounded by and fused to a metal washer 17. Lead-wire 12, having been previously butt-welded to a nickel wire 21, extends into eyelet 20 so that the weld, shown at 19, is about mid-way within the eyelet. The end of the casing is spun in slightly to temporarily hold the seal in position and facilitate handling of the unit. The glass-to-metal seal is then firmly forced against the elastomer O-ring and the Teflon gasket. With this pressure applied the glass-to-metal seal is soldered to the wall of the case as shown at 18. The butt-welded lead is then held in place by solder 22. To insure a firm seal a suitable caulking or adhesive material 28 may be inserted in the groove of annulus 13. The elastomer O-ring under compression and the tight fit of the Teflon gasket about the lead-wire 12 make it virtually impossible for the electrolyte to creep past these points to the glass-to-metal seal. This construction constitutes the preferred double seal of the invention.

If, instead of metal annulus 13, the Teflon gasket 14 were constructed to receive the internal beading 27, the seal would not hold under the pressure applied during the soldering of the glass-to-metal seal to the can wall. Experience has shown that under such pressure there occurs a displacement of the gasket from the internal beading. This permits electrolyte creepage up the wall of the can. The function of metal annulus 13 is to eliminate any such displacement by providing a firm abutment against which the resilient O-ring can be compressed.

FIGURE 2 is a modification of FIGURE 1. The metal annulus 13 has an elastomer plug or sleeve 24 fitted within the center thereof and vulcanized thereto. Sandwiched between this combination and the glass-to-metal seal is an elastomer O-ring 15 seated in a peripheral recess in a Teflon gasket 25.

FIGURE 3 is yet another modification wherein the Teflon gasket 14 and the elastomer O-ring 15 of FIGURE 1 are replaced by a single elastomer gasket 23, the lower half of which is fitted within said metal annulus and vulcanized thereto, and the upper half, which corresponds to the shape and cross-sectional area of said capacitor case, is sandwiched between said glass-to-metal seal and said metal annulus.

The seals of FIGURES 2 and 3 are as effective as that of FIGURE 1 but are somewhat more expensive because the elastomer is vulcanized to the metal annulus. Also because of the size of gasket 23 considerable force is required to compress the same and hold the glass-to-metal seal in place during soldering. However, where expense is not to be considered, the use of an elastomer gasket as in FIGURES 2 and 3 provides an excellent seal at lead wire 12.

The metal employed for the capacitor case or tube and annulus 13 is silver or silver-plated brass. While a variety of metals may be employed as metal washer 17 and eyelet 20, tin coated steel is preferred. Because of its strength and inertness polytetrafluoroethylene is preferred for gaskets 14 and 25. The elastomer O-ring 15, plug 24 and gasket 23 may be of any tough, rubber-like material, which is chemically compatible with the electrolyte employed, e.g. a high molecular weight copolymer of ethylene and propylene. Butyl rubber or neoprene may also be used. The glass-to-metal seal may be of the compression type or one wherein the parts of the seal have a more or less matched coefficient of thermal expansion. The solderable wire 21 may be any such metal, e.g. nickel, etc. In order to insure a better seal between the internal beading 27 and annulus 13 any tacky hydrocarbon adhesive or caulking material may be inserted in the groove of the annulus. This material may be polybutadiene, polyisobutylene, etc. and should have a viscosity within from 50 to 100,000 cps.

The capacitor assembly may be any of the well known types, such as a convolutely wound foil section, as well as the miniature etched or plain anode wire constructions. The anode material and the lead-wire attached thereto is of a valve-metal such as tantalum, aluminum, zirconium, niobium, etc. These materials are formed with an oxide film the thickness of which is dictated by the voltage application to which the capacitor is to be exposed.

It is to be understood that the invention is not limited to the specifice embodiments hereof except as defined in the appended claims.

What is claimed is:

1. A sealed electrolytic capacitor comprising a metal capacitor case containing a filmed valve-metal anode with attached filmed valve-metal lead-wire, an electrolyte, a circumferentially grooved metal annulus adjacent said anode and held in place by engaging said groove with an internal beading of the wall of said case, said annulus supporting a compressible member which is positioned about said lead-wire and abutting a glass-to-metal seal, said seal comprising a mass of glass surrounding and fused to a tubular metal eyelet and surrounded by and fused to a metal washer, said washer being soldered at its periphery to the case wall; and a solderable lead-wire butt-welded to said valve-metal lead-wire at a point about midway within said tubular metal eyelet and held in place by solder.

2. The capacitor of claim 1 wherein said compressible member is an elastomer O-ring seated in a peripheral recess in the upper half of a polytetrafluoroethylene gasket, the lower half being press-fitted within said metal annulus.

3. The capacitor of claim 1 wherein said compressible member is an elastomer O-ring seated in a peripheral recess of a polytetrafluoroethylene gasket which is sandwiched between said glass-to-metal seal and metal annulus, said annulus having an elastomer plug fitted within the center thereof and vulcanized thereto.

4. The capacitor of claim 1 wherein said compressible member is an elastomer gasket, the lower half of which is fitted within said metal annulus and vulcanized thereto and the upper half, which corresponds to the shape and cross-sectional area of said case, is sandwiched between said glass-to-metal seal and said metal annulus.

5. The capacitor of claim 1 wherein a tacky hydrocarbon caulking material is positioned within the groove of said annulus.

6. A sealed electrolytic capacitor, comprising a metal capacitor case containing a filmed tantalum anode with attached filmed tantalum lead-wire, an electrolyte, a circumferentially grooved metal annulus adjacent said anode and held in place by engaging said groove with an internal beading of the wall of said case, said annulus supporting a compressible member which is positioned about said lead-wire, said member being an elastomer O-ring seated in a peripheral recess in the upper half of a polytetrafluoroethylene gasket, the lower half being press-fitted within said annulus, said member abutting a glass-to-metal seal, said seal comprising a mass of glass surrounding and fused to a tubular metal eyelet and surrounded by and fused to a metal washer, said washer being soldered at its periphery to the case wall; a solderable lead-wire butt-welded to said tantalum lead-wire at a point about midway within said tubular metal eyelet and held in place by solder.

References Cited in the file of this patent

UNITED STATES PATENTS

| | | |
|---|---|---|
| 2,825,855 | Frekko | Mar. 4, 1958 |
| 3,114,085 | Ruscetta et al. | Dec. 10, 1963 |